J. W. HAYNIE.
DIVING TUBE.
APPLICATION FILED FEB. 12, 1921.

1,385,682.

Patented July 26, 1921.

INVENTOR:
J. W. Haynie
BY Adam E Fishe
ATTORNEY.

UNITED STATES PATENT OFFICE.

JOHN W. HAYNIE, OF ST. LOUIS, MISSOURI.

DIVING-TUBE.

1,385,682.  Specification of Letters Patent.  Patented July 26, 1921.

Application filed February 12, 1921. Serial No. 444,383.

*To all whom it may concern:*

Be it known that I, JOHN W. HAYNIE, a citizen of the United States, residing in the city of St. Louis and State of Missouri, have invented new and useful Improvements in Diving-Tubes, of which the following is a specification, reference being had to the accompanying drawings.

This invention pertains to diving tubes, for use in raising sunken vessels, or for any similar work under water. The object is to provide a practical and efficient apparatus of this kind, the same being constructed in sections and adapted to be lowered into the water to any required depth, and having manually operable levers and arms extended outside the casing for grappling the sunken vessel or for other purposes.

Figure 1:
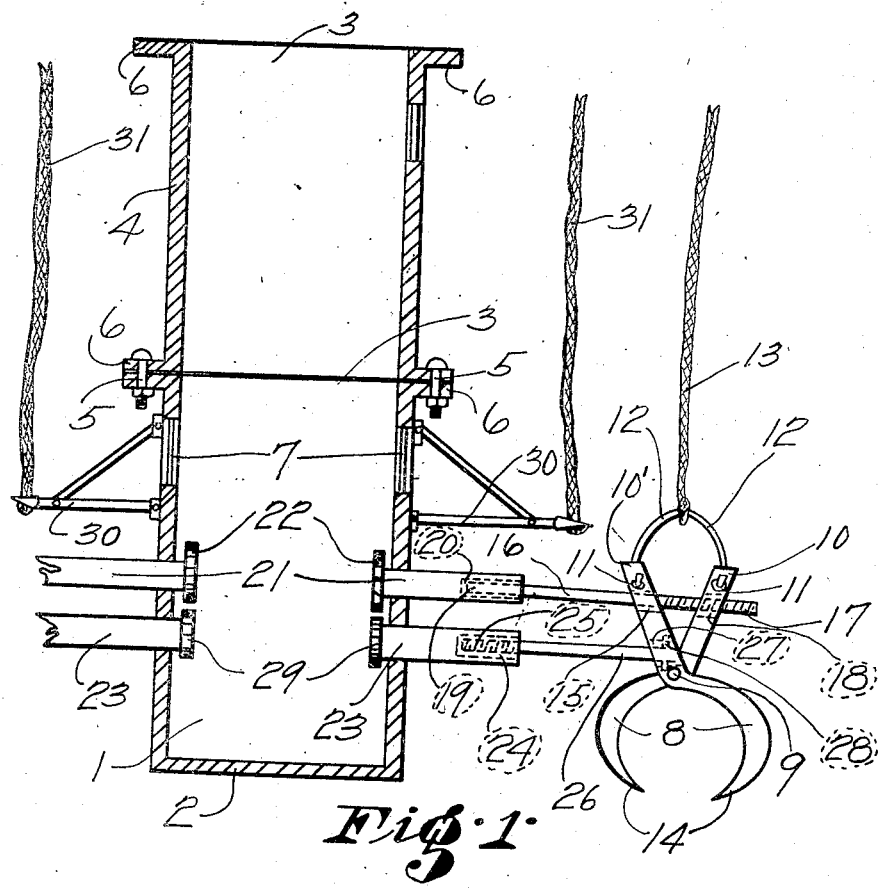
Figure 1 is a vertical sectional view of the tube, showing the inside of the tube, the grappling hooks however, being shown in full.
Figure 2:
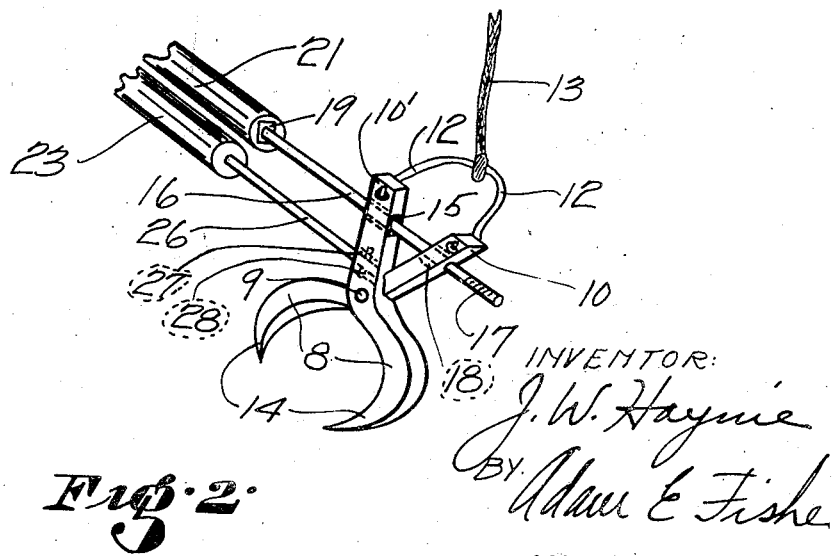
Fig. 2 is a perspective view of one of the grappling hooks and connected operating arms.

The invention consists in providing a number of cylindrical casings or tubes, of any suitable material such as metal, and of a diameter sufficient to accommodate one or more men within the tubes to work the mechanism. These tubes are of the same diameter and length, and one of them, designated the base tube 1, is closed at the bottom 2 so as to exclude water, but is open at its top 3. All the other or secondary tubes 4 are open at both ends. These tubes are adapted for locking together by means of bolts 5 passed through the ears 6 at the ends of the casings; and the connected ends may be made air tight in any conventional manner.

The base tube 1 (and the others also if desired) is provided with a number of lookout windows 7 so that the operator may intelligently direct the manipulation of the grappling hooks 8. These grappling hooks are of the ordinary two-forked variety pivoted together at 9 and having the extended shanks 10—10'. Holes 11 are cut through the ends of the shanks to receive the branched ends 12 of the cable 13. Thus when the cable is pulled upon, the jaws 14 of the hooks close together upon any object that may be between them. One of the shanks, as 10', is provided with a slot 15 to freely pass the bit 16 which is threaded at its outer end 17 and thereby adapted to engage the threaded bore 18 formed through the other shank 10. The bit 16 has a squared shank 19 adapted to slidingly engage the squared socket 20 formed in the end of the arm 21. The arm 21, in turn, is slidingly and also rotatively mounted through the wall of the base tube 1, being suitably packed to prevent leakage, and an operating wheel 22 is mounted at the inner end of the arm 21. An auxiliary arm 23 is similarly extended through the wall immediately below the arm 21, and this arm 23 carries an interiorly threaded sleeve 24 adapted to engage the threaded end 25 of the pin 26. The end of the pin 26 is inserted in a slot 27 cut in the shank 10' and is pivotally held therein by means of a pin 28. An inner operating wheel 29 is likewise provided for the arm 23. Thus the hooks 8 may be thrust outward or drawn inward by shoving or pulling upon the arms 21 and 23; and by rotating said arms the jaws 14 may be opened or closed as desired. When the jaws 14 have been located upon the object to be raised, then the arm 23 may be unscrewed from the pin 26, and the arm 21 may be pulled off of the shank of the bit 16, thus entirely releasing the hooks 8. Then by drawing upward on the cable 13, the sunken object is raised. The tubes are lowered into the water vertically, and joined together to provide the required length to extend to the point desired. For this work any ordinary flat-boat or dock may be employed to facilitate operation; also any mechanism may be employed to lower the tubes. For short distances, the cables 31 attached to the brackets 30 affixed to the sides of the base tube 1 would suffice.

While I have herein described a certain specific method of constructing and assembling the elements of my invention, it is understood the same may be varied in minor details, not departing from the spirit of my invention as defined in the appended claims.

I claim:

1. In combination with a diving tube and a pair of grappling hooks, two arms slidingly and rotatively extended through the tube walls, one of said arms having screw threaded connection with one shank of the hooks and the other arm having pivotal connection with the other shank.

2. In combination with a diving tube and a pair of pivoted grappling hooks, having two slots cut through one shank and a screw threaded bore in the other shank; two arms slidingly and rotatively extended through the tube walls one above the other, the upper arm having a squared socket in its outer end, the lower arm having a screw threaded socket in its outer end; a square shanked and threaded bit slidingly engaging the socket in the upper arm, and passed through the upper slot in the one shank of the hooks and into engagement with the threaded bore of the opposite shank of the hooks; and a pin with a threaded shank engaging the threaded socket of the lower arm, and pivoted by its end into the lower slot in the said shank of said hooks.

JOHN W. HAYNIE.

Witnesses:
E. E. DOWNEY,
W. W. WILKE.